United States Patent
Su et al.

(10) Patent No.: US 10,753,737 B1
(45) Date of Patent: Aug. 25, 2020

(54) METHOD AND OPTICAL SYSTEM FOR RECONSTRUCTING SURFACE OF OBJECT

(71) Applicant: National Central University, Taoyuan (TW)

(72) Inventors: Wei-Hung Su, Kaohsiung (TW); Yeh-Wei Yu, Taoyuan (TW); Ching-Cherng Sun, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 0 days.

(21) Appl. No.: 16/690,141

(22) Filed: Nov. 21, 2019

(30) Foreign Application Priority Data

Aug. 27, 2019 (TW) .............................. 108130683 A

(51) Int. Cl.
*G01B 11/25* (2006.01)
*G01B 11/24* (2006.01)

(52) U.S. Cl.
CPC .......... *G01B 11/2518* (2013.01); *G01B 11/24* (2013.01); *G01B 11/2441* (2013.01); *G01B 11/25* (2013.01); *G01B 11/2513* (2013.01)

(58) Field of Classification Search
CPC ..... G01B 11/22; G01B 11/24; G01B 11/2408; G01B 11/2416; G01B 11/2425; G01B 11/2433; G01B 11/2441; G01B 11/25; G01B 11/2513; G01B 11/2518; G01B 11/2522; G01B 11/2527; G01B 11/2531; G01B 11/2536; G01B 11/254; G01B 11/2545
See application file for complete search history.

(56) References Cited

U.S. PATENT DOCUMENTS

| | | | |
|---|---|---|---|
| 8,649,024 B2 * | 2/2014 | Colonna de Lega | ......................... G01B 11/2441 356/609 |
| 9,739,602 B2 * | 8/2017 | Su | ........................ G01B 11/25 |
| 9,824,452 B2 * | 11/2017 | Su | ........................ G01B 11/254 |
| 10,267,626 B2 * | 4/2019 | Morimoto | .......... G01B 11/2513 |
| 2003/0016366 A1 * | 1/2003 | Takeda | ............... G01B 11/2513 356/604 |
| 2003/0043387 A1 * | 3/2003 | Lim | ................... G01B 11/2527 356/605 |

(Continued)

FOREIGN PATENT DOCUMENTS

| CN | 101667303 B | 1/2013 |
|---|---|---|
| CN | 103292740 A | 9/2013 |

(Continued)

*Primary Examiner* — Gordon J Stock, Jr.
(74) *Attorney, Agent, or Firm* — CKC & Partners Co., LLC

(57) ABSTRACT

A method for reconstructing a surface of an object includes the steps as follows. A light beam is modulated by a spatial light modulator (SLM) and is projected to form a pattern, wherein the pattern has a transmittance distribution in a cosine distribution such that the pattern is formed to become a fringe pattern with a periodic change. A first impulse and a second impulse present within a first period and a second period of the cosine distribution, wherein a position where the first impulse occurs within the first period and a position where the second impulse occurs within the second period are different. The light beam is guided to an object so as to form a scan pattern on the object. The scan pattern is read. According to the scan pattern, a surface profile of the object is calculated.

12 Claims, 5 Drawing Sheets

(56) References Cited

U.S. PATENT DOCUMENTS

| | | | |
|---|---|---|---|
| 2010/0098323 A1* | 4/2010 | Agrawal | G06T 7/557 |
| | | | 382/154 |
| 2011/0279670 A1* | 11/2011 | Park | G01B 11/2518 |
| | | | 348/136 |
| 2014/0320605 A1 | 10/2014 | Johnson | |
| 2017/0239719 A1 | 8/2017 | Buller et al. | |
| 2020/0143553 A1* | 5/2020 | Link | H04N 5/2226 |

FOREIGN PATENT DOCUMENTS

| | | |
|---|---|---|
| CN | 104330052 A | 2/2015 |
| CN | 106137531 A | 11/2016 |
| TW | I271904 B | 1/2007 |
| TW | I553291 B | 10/2016 |

\* cited by examiner

US 10,753,737 B1

METHOD AND OPTICAL SYSTEM FOR RECONSTRUCTING SURFACE OF OBJECT

CROSS-REFERENCE TO RELATED APPLICATION

This application claims priority to Taiwan Application Serial Number 108130683, filed Aug. 27, 2019, which is herein incorporated by reference in its entirety.

BACKGROUND

Field of Invention

The present invention relates to a method and an optical system for reconstructing a surface of an object.

Description of Related Art

As the development of the technique, the method for scanning an object has been already progressed from a two-dimensional method to a three-dimensional method, and the three-dimensional scanning method is also called as a three-dimensional reconstruction. The three-dimensional reconstruction could be calculated from reading the result of the two-dimensional projection. The two-dimensional projection is achieved by an optical system. The optical system could include a depth lens, for example, the optical system can include an active depth sensor or a stereo camera. A surface profile of the object is scanned and obtained by the three-dimensional reconstruction.

However, when the surface profile of the object has a gap, the light beam projected to the surface of the object presents a discontinuous fringe image due to the gap. The discontinuous fringe image might cause misjudgment when a depth of the object surface is calculated by the optical system, thereby resulting in the scan result distortion. Therefore, how to improve the accuracy of the three-dimensional reconstruction becomes the present research aim in the related field.

SUMMARY

According to one aspect of the present disclosure, a method for reconstructing a surface of an object includes the steps as follows. A light beam is modulated by a spatial light modulator (SLM). The light beam is projected to form a pattern, wherein the pattern has a transmittance distribution in a cosine distribution such that the pattern is formed to become a fringe pattern with a periodic change. The transmittance distribution at least includes a first impulse and a second impulse, and the first impulse and the second impulse respectively present within a first period and a second period of the cosine distribution, wherein a position where the first impulse occurs within the first period and a position where the second impulse occurs within the second period are different. The light beam is guided to an object so as to form a scan pattern on the object. The scan pattern is read. According to the scan pattern, a surface profile of the object is calculated.

According to some embodiments, the pattern is formed by a plurality of pixels aligned along a direction of a straight line, and the cosine distribution satisfies:

$$t = A + B\cos\left[\frac{2\pi x}{T_0} + \frac{2\pi m}{M}\delta(x - nT_0 - l)\right],$$

wherein t is the transmittance distribution of the fringe pattern, A and B are real numbers, x is a pixel order on the direction of the straight line, $T_0$ is a fringe period of the fringe pattern, and x. M, m, n and l are positive natural numbers, wherein m<M, 1<$T_0$, and the positions where the first impulse and the second impulse occur within are defined by $\delta(x - nT_0 - l)$.

According to some embodiments, a peak value of the first impulse and a peak value of the second impulse are different.

According to some embodiments, the first period and the second period are two continuous periods of the cosine distribution.

According to some embodiments, the step of calculating the surface profile of the object includes reconstructing the surface profile of the object by a phase-shifting interferometry, and the phase-shifting interferometry is at least a three-step phase-shifting.

According to another aspect of the present disclosure, a method for reconstructing a surface of an object includes the steps as follows. A light beam is modulated by a spatial light modulator (SLM). The light beam is projected to form a pattern, wherein the pattern has a transmittance distribution defined by a sinusoidal wave equation such that the pattern is formed to become a fringe pattern with a phase distribution. A first period of the phase distribution presents an impulse variation in a first degree, and a second period of the phase distribution presents an impulse variation in a second degree. A position where the impulse variation in the first degree occurs within the first period is a first relative position, and a position wherein the impulse variation in the second degree occurs within the second period is a second relative position. The first degree and the second degree have difference, or the first relative position and the second relative position have difference. The light beam is guided to an object so as to form a scan pattern on the object. The scan pattern is read. According to the scan pattern, a surface profile of the object is calculated.

According to some embodiments, the pattern is formed by a plurality of pixels aligned along a direction of a straight line, and the sinusoidal wave equation satisfies:

$$t = A + B\cos\left[\frac{2\pi x}{T_0} + \frac{2\pi m}{M}\delta(x - nT_0 - l)\right],$$

wherein t is the transmittance distribution of the fringe pattern, A and B are real numbers, x is a pixel order on the direction of the straight line, $T_0$ is a fringe period of the fringe pattern, and x. M, m, n and l are positive natural numbers, wherein m<M, 1<$T_0$, and the positions where the first relative position and the second relative position occur are defined by $\delta(x - nT_0 - l)$.

According to some embodiments, the first degree and the second degree are different, and the first relative position and the second relative position are the same.

According to some embodiments, the first degree and the second degree are the same, and the first relative position and the second relative position are different.

According to some embodiments, the first degree and the second degree are different, and the first relative position and the second relative position are different.

According to further another aspect of the present disclosure, an optical system for reconstructing a surface of an object includes a spatial light modulator (SLM), an image receiving device, and a pair of light guiding lenses. The spatial light modulator modulates a light beam, and the light beam is projected to form a pattern, wherein the pattern has a transmittance distribution defined by a sinusoidal wave equation such that the pattern is formed to become a fringe pattern with a phase distribution. A first period of the phase distribution presents an impulse variation in a first degree, and a second period of the phase distribution presents an impulse variation in a second degree, wherein a position where the impulse variation in the first degree occurs within the first period is a first relative position, and a position wherein the impulse variation in the second degree occurs within the second period is a second relative position. The first degree and the second degree have difference, or the first relative position and the second relative position have difference. The pair of light guiding lenses are respectively optical coupled to the spatial light modulator and the image receiving device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
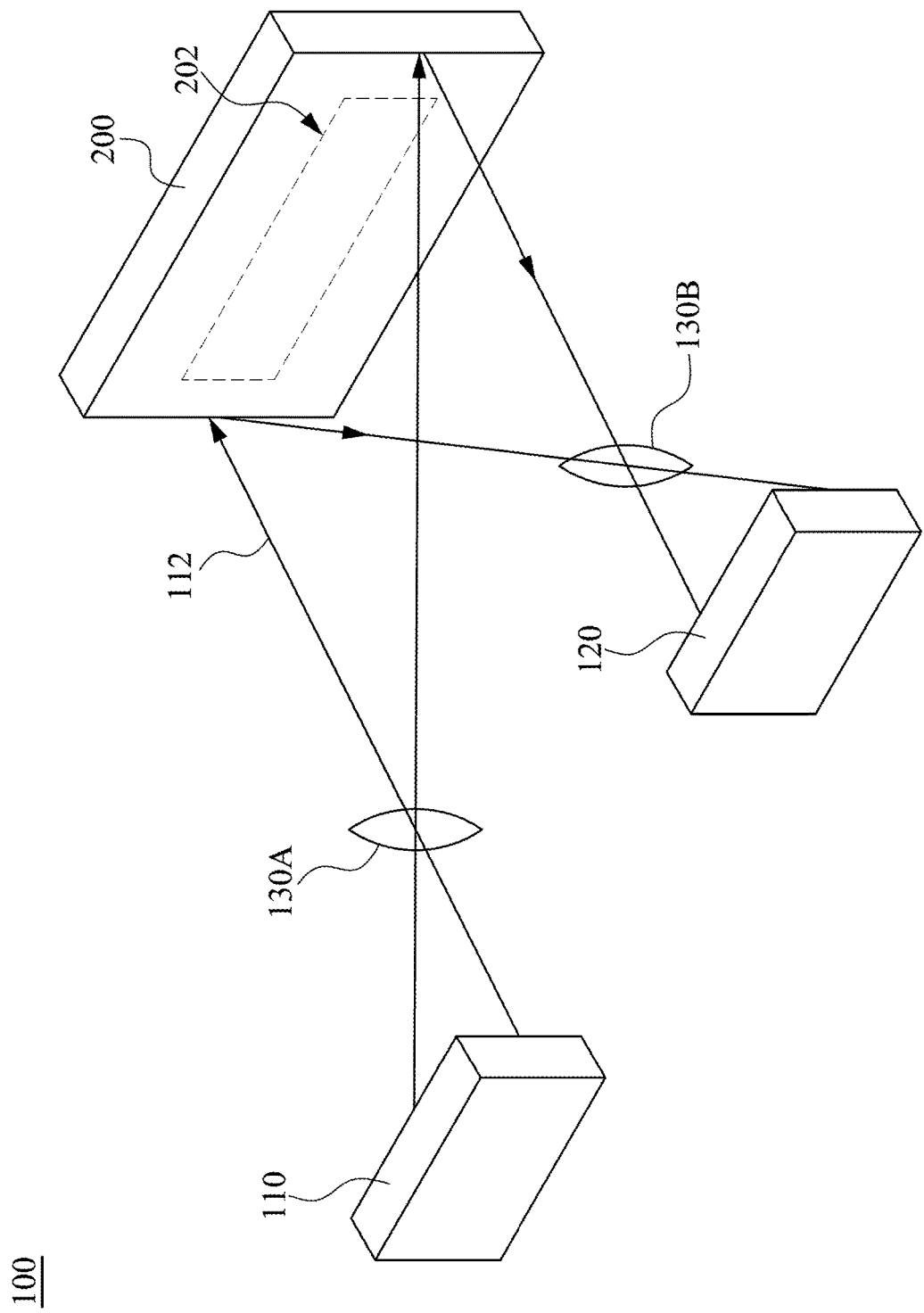
FIG. 1 is a light path view while an optical system according to one embodiment of the present disclosure is scanning.

Reference will now be made in detail to the present embodiments of the invention, examples of which are illustrated in the accompanying drawings. Wherever possible, the same reference numbers are used in the drawings and the description to refer to the same or like parts.

In the present disclosure, the terms such as "the first", "the second", and "the third" which are used to describe various elements, components, areas, layers and/or blocks could be understand. But these elements, components, areas, layers and/or blocks should not be limited by these terms. These terms are only limited to use for distinguishing single element, component, area, layer and/or block. Therefore, a first element, component, area, layer and/or block also can be called as a second element, component, area, layer and/or block, but without departing from the scope or spirit of the present disclosure.

The present disclosure provides an optical system for reconstructing a surface of an object, which codes a light beam by a spatial light modulator (SLM). The light beam modulated by the spatial light modulator is projected to an object to form a periodic fringe pattern on the object. The periodic fringe pattern could be a basis for calculating a surface profile of the object. Each fringe of the periodic fringe pattern has recognizability, so as to avoid the distortion of the reconstructing result causing by a gap on the surface of the object.

Please refer to FIG. 1, which is a light path view while an optical system 100 according to one embodiment of the present disclosure is scanning. The optical system 100 could project a light beam 112 to an object 200, so as to reconstruct the three-dimensional surface coordinate of the object 200. The optical system 100 includes a spatial light modulator 110, an image receiving device 120 and at least one pair of light guiding lenses 130A, 130B. The spatial light modulator 110 could modulate a light beam according to a coding rule. The following description will explain the properties of the light beam modulated by the spatial light modulator 110.

Figure 2:
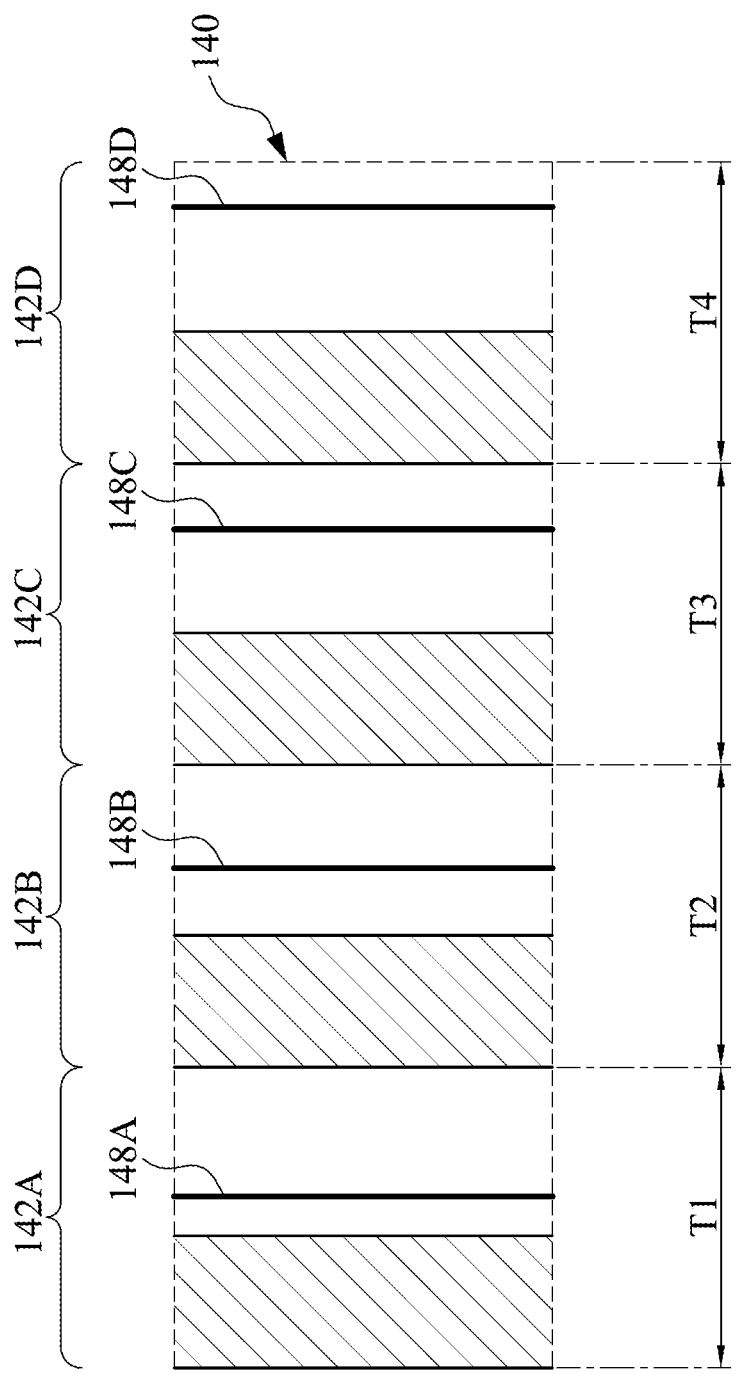
FIG. 2 is a schematic view of a pattern formed by projecting a light beam modulated by a spatial light modulator to a flat surface.

Please refer to FIG. 2, which is a schematic view of a pattern 140 formed by projecting a light beam modulated by a spatial light modulator to a flat surface. In FIG. 2, the pattern 140 is a fringe pattern. The reason that the pattern 140 is formed to become the fringe pattern is that the pattern 140 formed by the light beam modulated by the spatial light modulator has a transmittance distribution that could satisfy a sinusoidal wave equation. Taking FIG. 2 for example, the fringe pattern is divided into a first period T1, a second period T2, a third period T3 and a fourth period T4. The first period T1, the second period T2, the third period T3 and the fourth period T4 are four continuous periods of the fringe pattern.

A first fringe 142A, a second fringe 142B, a third fringe 142C and a fourth fringe 142D respectively present within the first period T1, the second period T2, the third period T3 and the fourth period T4. The brightness and the intensity of these fringes could present a gradient distribution in practice, for example, the intensity of the first fringe 142A is gradually changed from left to right. The fringe pattern shown in FIG. 2 is merely for example, but not used to limit the distribution of the bright fringe and the dark fringe of the fringe pattern.

Figure 3:
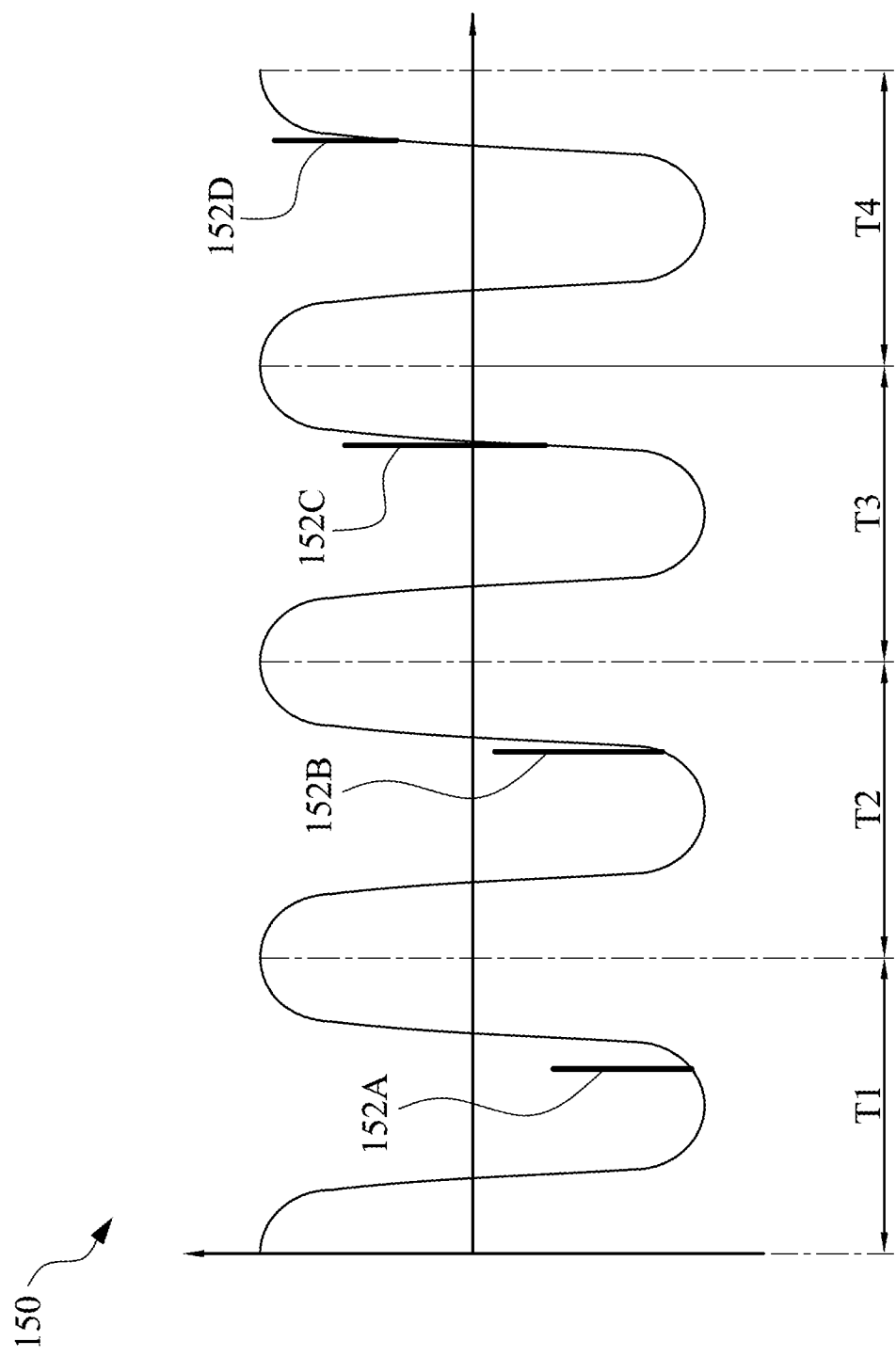
FIG. 3 is a schematic view of a transmittance distribution of a pattern formed by projecting a light beam modulated by a spatial light modulator to a flat surface.

Please refer to FIG. 3, which is a schematic view of a transmittance distribution 150 of the pattern 140 formed by projecting a light beam modulated by a spatial light modulator to a flat surface. In FIG. 3, the vertical axis represents the transmittance, and the horizontal axis represents the pixel order, in which the pixel order corresponds to the pixel arraying along a direction of a straight line (such as a horizontal direction of the spatial light modulator) of the spatial light modulator. In other words, for the pattern (such as the pattern 140 in FIG. 2) formed from projecting the light beam modulated by the spatial light modulator to a flat surface, the pattern could be considered as being formed by a plurality of pixels arraying along a direction of the straight line.

As shown in FIG. 3, as described above, the transmittance distribution 150 of the pattern satisfies a sinusoidal wave equation. More specifically, the transmittance distribution 150 of the pattern could be a cosine distribution, which the transmittance distribution 150 of the pattern is changed along with the different pixel position. Because the transmittance distribution 150 of the pattern satisfies the sinusoidal wave equation, the pattern 140 in FIG. 2 is formed to become a fringe pattern with a periodic change. For the transmittance distribution 150 presenting the cosine distribution, it could be divided into various periods. Taking FIG. 3 as example, the transmittance distribution 150 presenting the cosine distribution could be divided into a first period T1, a second period T2, a third period T3 and a fourth period T4. The first period T1, the second period T2, the third period T3 and the fourth period T4 are four continuous periods.

In the transmittance distribution 150, each period of the cosine distribution has an impulse, and these impulses are recognizable. For example, the transmittance distribution 150 includes a first impulse 152A, a second impulse 152B, a third impulse 152C and a fourth impulse 152D. The first impulse 152A presents within the first period T1 of the cosine distribution, the second impulse 152B presents within the second period T2 of the cosine distribution, the third impulse 152C presents within the third period T3 of the cosine distribution and the fourth impulse 152D presents within the fourth period T4.

The first impulse 152A, the second impulse 152B, the third impulse 152C and the fourth impulse 152D can be distinguished from each other because the positions where they occur within the corresponded periods are different. For example, if a phase of the start point of each period is 0 and a phase of an end point is $2\pi$, a position where the first impulse 152A occurs within the first period T1 is closer to the phase 0 than that position where the second impulse 152B occurs within the second period T2. Therefore, the position where the first impulse 152A occurs within the first period T1 and the position where the second impulse 152B occurs within the second period T2 are different.

In some embodiments, the transmittance distribution 150 of the fringe pattern presenting the cosine distribution satisfies the equation (I):

$$t = A + B\cos\left[\frac{2\pi x}{T_0} + \frac{2\pi m}{M}\delta(x - nT_0 - l)\right], \quad (I)$$

in which t is the transmittance distribution of the fringe pattern, A and B are real numbers (for example, A could be ½, and B could be ½), x is a pixel order on the direction of the straight line, $T_0$ is a fringe period of the fringe pattern, n is a fringe order, and x. M, m, n and 1 are positive natural numbers, wherein 1<n<N, m<M, 1<$T_0$, 0≤x≤N*$T_0$. Each parameter could be adjusted as demand, for example, m and M could be changed for corresponding to different n value (i.e., corresponding to the fringe with different order).

The occurrence position of each impulse could be defined by the term $\delta(x-nT_0-1)$, wherein when the value of $(x-nT_0-1)$ is 0 (i.e., $x=nT_0+1$), the value of the term $\delta(x-nT_0-1)$ is 1, and when $(x-nT_0-1)$ is not 0 (i.e., $x \neq nT_0+1$), the value of the term $\delta(x-nT_0-1)$ is 0.

Therefore, when x goes with the chosen parameter to make that the value of the term $\delta(x-nT_0-1)$ is 1, the transmittance distribution 150 of the fringe pattern has pulses occurring at the position corresponded to the x value (such as continuous or discontinuous pulse), and the pulses become the impulses in the transmittance distribution 150, like the first impulse 152A, the second impulse 152B, the third impulse 152C and the fourth impulse 152D. Because the impulse caused by the term $\delta(x-nT_0-1)$ is formed by the pulses which occur in the transmittance, these impulses also occur in the pattern 140 in FIG. 2, such as impulse fringes 148A, 148B, 148C and 148D.

Additionally, in some embodiments, the different impulses can be corresponded to the different positions of the cosine distribution, so as to make the peak values of the different impulses are different. For example, the peak value of the first impulse 152A and the peak value of the second impulse 152B are different. The difference among the different impulses could be further increased by making the peak value of the different impulses different, so as to make the different impulse be identified more easily.

On the other hands, in the cosine function, the term related to the independent variable (such as pixel order x) would determine the pattern phase of the cosine function. Taking the equation (I) as example, the term $(2\pi x/T_0)$ and the term $\delta(x-nT_0-1)$ would determine the pattern phase of the cosine function. The term $(2\pi x/T_0)$ makes one fringe present in every $T_0$ period of the phase distribution of the transmittance distribution 150. The term $\delta(x-nT_0-1)$ due to its property makes the transmittance distribution 150 has an impulse gap (such as continuous or discontinuous pulse) at the position corresponding to the x value when the value of the term $\delta(x-nT_0-1)$ is 1. Moreover, because m and M in the parameter $(2\pi m/M)$ of the term $\delta(x-nT_0-1)$ could be correspond to different n value (i.e., corresponding to the fringes with different order) to change, the pulse degree of these impulse gaps occurring within the phase distribution of the transmittance distribution 150 are also different.

Accordingly, in the phase distribution of the transmittance distribution 150, the occurrence position of the "impulse gap" and the amplitude of the "impulse gap" could be the coding basis of the transmittance distribution 150, such that the fringes presenting in each period of the phase distribution of the transmittance distribution is recognizable. For example, the different period of the phase distribution of the transmittance distribution 150 present the different degree of the impulse gap because of the term $\delta(x-nT_0-1)$.

Figure 4:
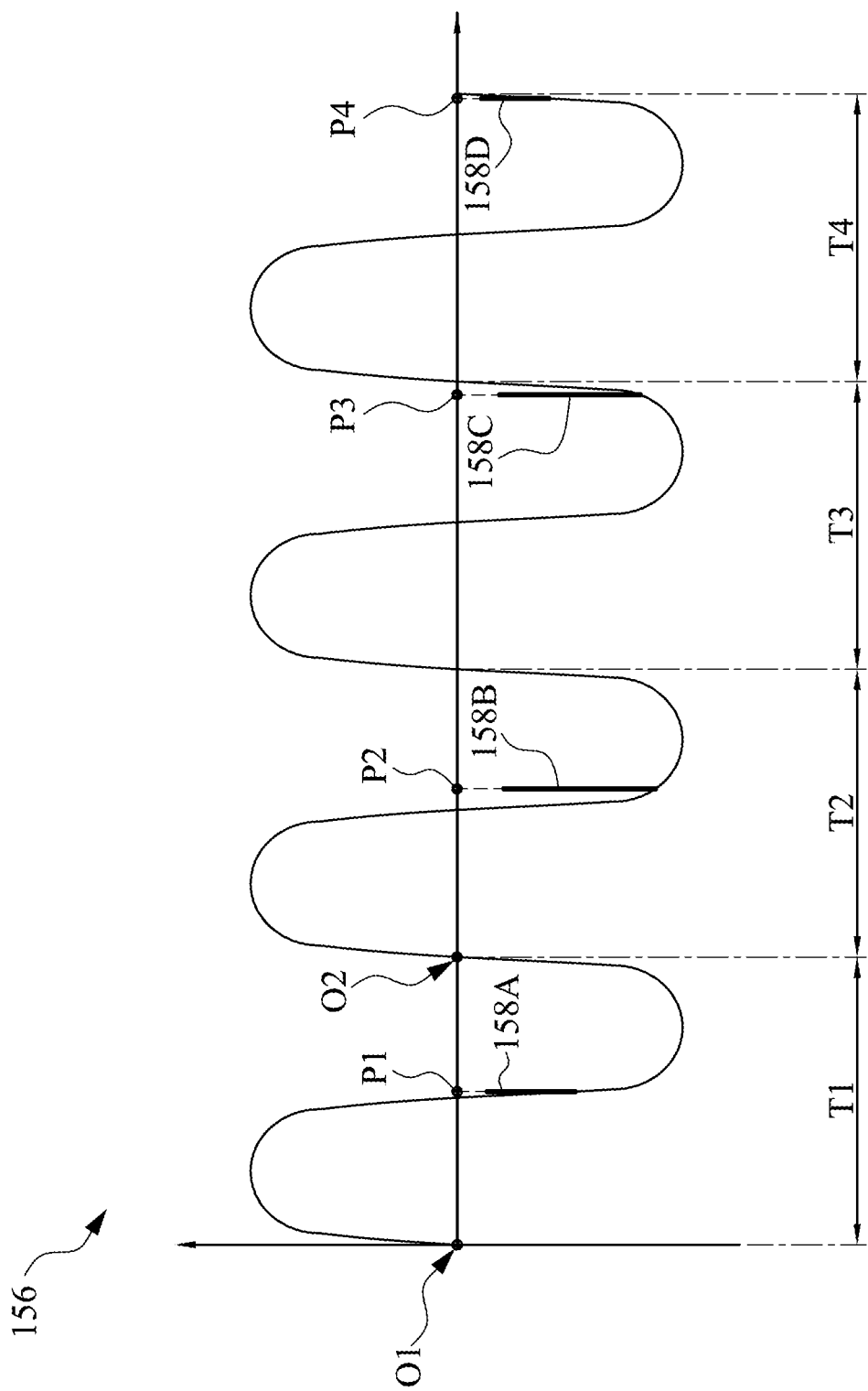
FIG. 4 is a schematic view of a phase distribution of a transmittance distribution of a pattern.

Please refer to FIG. 4, which is a schematic view of a phase distribution 156 of the transmittance distribution of the pattern. In FIG. 4, the maximum value in vertical axis of the phase distribution 156 could be $\pi$ and the minimum value could be $-\pi$; the horizontal axis of the phase distribution could represent pixel order. Several periods could present in the phase distribution 156, such as the first period T1, the second period T2, the third period T3 and the fourth period T4, and the impulses present in these periods due to the term $\delta(x-nT_0-1)$. For example, an impulse variation 158A in a first degree presents in the first period T1 of the phase distribution 156, and a position that the impulse variation 158A in the first degree occurs in the first period T1 is a first relative position P1. "The first relative position P1" mentioned herein means a position of the impulse variation 158A in the first degree relative to the starting point O1 of the first period T1. An impulse variation 158B in a second degree presents in the second period T2 of the phase distribution 156, and a position that the impulse variation 158B in the second degree occurs in the second period T2 is a second relative position P2. Similarly, "the second relative position P2" mentioned herein means a position of the impulse variation 158B in the second degree relative to the starting point O2 of the second period T2. An impulse variation 158C in a third degree presents in the third period T3 of the phase distribution 156, and a position that the impulse variation 158C in the third degree occurs in the third period T3 is a third relative position P3. An impulse variation 158D in a fourth degree presents in the fourth period T4 of the phase distribution 156, and a position that the impulse variation 158D in the fourth degree occurs in the fourth period T4 is a fourth relative position P4.

In order to enhance the recognizability of the coding, the impulse variations 158A-158D in the first degree to the fourth degree have differences among one another, or the first relative position P1, the second relative P2, the third relative position P3 and the fourth relative position P4 have differences among one another. Or, the impulse variations 158A-158D in the first degree to the fourth degree have differences among one another, and the first relative position P1, the second relative P2, the third relative position P3 and the fourth relative position P4 also have differences among one another.

For example, in the embodiment, the variation degree of the impulse variation 158A in the first degree and the impulse variation 158B in the second degree are different, and the first relative position P1 and the second relative position P2 are different. Accordingly, the fringe shown in the first period T1 of the phase distribution 156 and the fringe shown in the second period T2 of the phase distribution 156 are distinguished from each other because of the impulse difference between them. In some embodiments, the first degree and the second degree are the same, and the first relative position and the second relative position are different. In some other embodiments, the first degree and the second degree are different, and the first relative position and the second relative position are the same.

Because the impulse variation of the different periods could have recognizability by the "amplitude difference", the "position difference", or the "combination difference of the amplitude and position", the fringe of each period is recognizable. The "recognizable" herein means that the impulse variation resulting from the term $\delta(x-nT_0-l)$ and the position where the impulse occurs could become the coding basis, and according to the coding basis, the pixel order corresponding to each fringe could be known.

Please refer back to FIG. 1. The image receiving device 120 could be a charge coupled device (CCD). The pair of light guiding lenses 130A, 130B are respectively optically coupled to the spatial light modulator 110 and the image receiving device 120, such that the light beam 112 providing by the spatial light modulator 110 is projected or guided to the object 200 via the light guiding lens 130A, thereby forming a scan pattern 202 on the object 200. The scan pattern 202 on the object 200 is then guided or projected to the image receiving device 120 by the light guiding lens 130B, and the image receiving device 120 reads the scan pattern 202. The scan pattern 202 received by the image receiving device 120 could be the basis for calculating the surface profile of the object 200, that is, the surface profile of the target object is calculated according to the scan pattern 202.

Specifically, the appearance of the scan pattern 202 projected to the object 200 is similar to the appearance of the pattern 140 in FIG. 2. However, the scan pattern 202 could be varied because of the surface profile of the object 200, for example, a distortion is produced because of the surface profile of the object, in which the change degree of the scan pattern 202 caused by the distortion can be the basis for determining the depth of the surface profile of the object 200.

On the other hand, the surface profile of the object 200 is reconstructed by the phase-shifting interferometry, and the phase-shifting interferometry is at least a three-step phase shifting, for example, the surface profile of the object 200 could be reconstructed by a five-step phase-shifting interferometry. Taking the five-step phase-shifting interferometry as example, five light beams are projected in sequence to the object 200 by the spatial light modulator 110 so as to form five scan patterns on the object 200 in sequence. The phase difference of these five sequential fringes is $2\pi/5$. The phase value of the twisted scan pattern caused by the surface profile of the object 200 could be known by the five-step phase-shifting interferometry.

Figure 5:
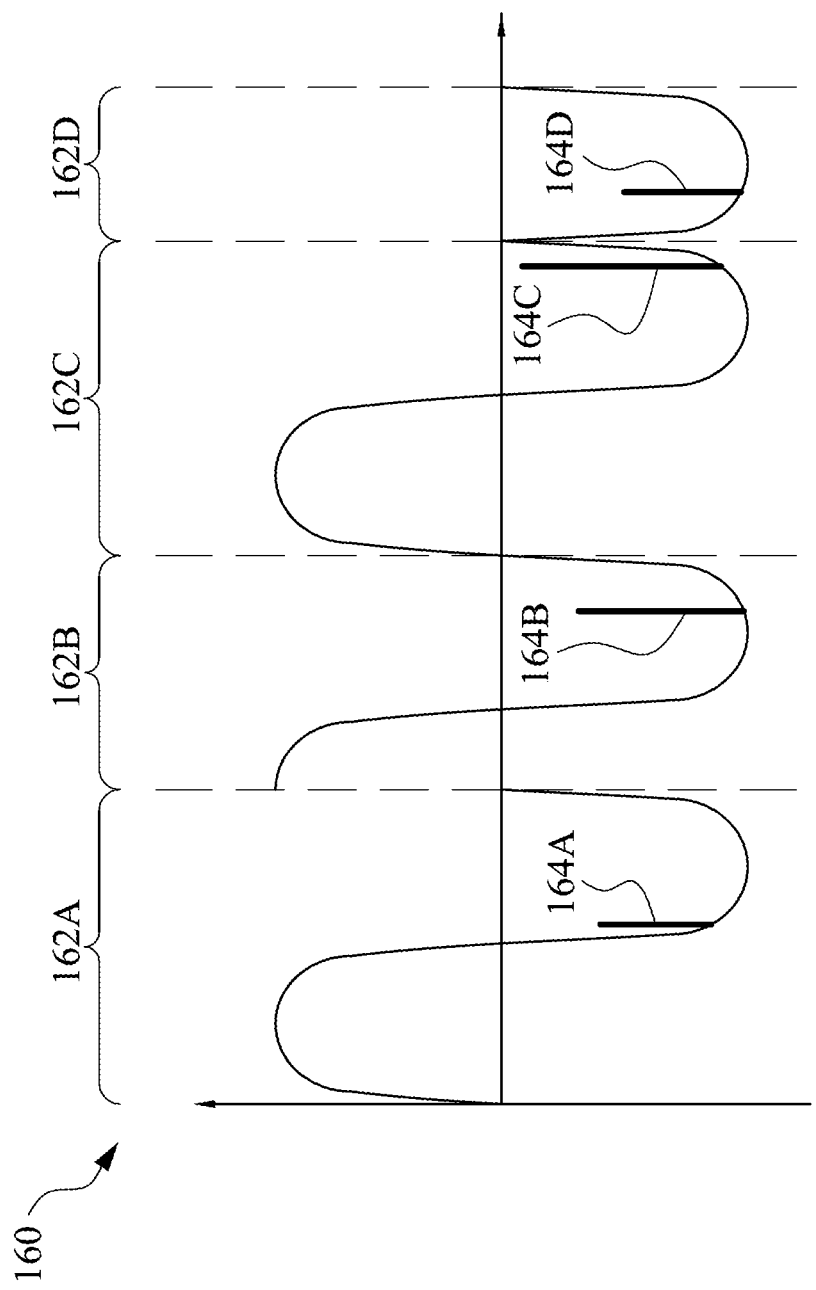
FIG. 5 is a schematic view of a phase distribution of a scan pattern received by an image receiving device according to one embodiment of the present disclosure is scanning.

When the surface profile of the object 200 has a depth gap, the fringe order of each period could be recognized by the aforementioned coding rule, so as to avoid erroneous judgement. For example, please refer to FIG. 5, which is a schematic view of a phase distribution 160 of a scan pattern received by an image receiving device according to one embodiment of the present disclosure. The phase distribution shown in FIG. 5 presents four waves corresponding to different fringes, respectively being marked as wave 162A, 162B, 162C and 162D. For the wave 162A and the wave 162B, the wave 162A and the wave 162B could be corresponded to two continuous fringes or could be corresponded to two discontinuous fringes. That "corresponded to two continuous fringes" means the waves of the first period T1 and the second period T2 in FIG. 4 would form two continuous fringes, for example. That "corresponded to two discontinuous fringes" means the waves of the first period T1 and the third period T3 in FIG. 4 would form two discontinuous fringes, for example.

The reason that causes the wave 162A and the wave 162B to be corresponded two discontinuous fringes might that the part, which is projected to the depth gap of the scan pattern by the spatial light modulator, could not be read by the image receiving device, when the surface profile of the object has the depth gap. In other words, because the surface profile of the object has the depth gap, the fringe order of the fringe pattern received by the image receiving device is different from the fringe order of the fringe pattern provided by the spatial light modulator. When the fringe order of the fringe pattern received by the image receiving device is different from the fringe order of the fringe pattern provided by the spatial light modulator, the result of reconstruction of the surface of the object is distorted. For example, the depth gap could not be reconstructed.

Therefore, according the aforementioned coding rule, the fringe order of the fringe pattern received by the image receiving device could be obtained, such that the depth gap on the surface profile of the object can be reconstruct. For example, according to the impulse variation 164A, 164B, 164C and 164D in FIG. 5, the waves 162A-162D of the phase distribution 160 in FIG. 5 are respectively corresponded to the first fringe, the sixth fringe, the seventh fringe and the tenth fringe of the fringe pattern. Then, the second fringe to the fifth fringe, which are not received by the image receiving device, are determined to be projected to the depth gap on the surface profile of the object. Accordingly, the position corresponding to the second fringe to the fifth fringe of the fringe pattern is regarded as the depth gap on the surface profile of the object, so as to prevent the reconstruction of the surface profile of the object from distorting.

In summary, the present disclosure provides a method for reconstructing a surface of an object, which makes a scan pattern formed by the light beam have a transmittance distribution in a cosine distribution, and an impulse variation presents in the phase distribution of the transmittance distribution. The scan pattern could form a fringe pattern, and each fringe of the fringe pattern has a corresponding impulse variation. The different impulse variations have differences due to the variation degrees or occurrence positions. Therefore each fringe in the scan pattern is recognizable because of the difference of the impulse variation, so as to avoid the reconstruction result from distorting, which is caused by the gap on the surface of the object.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for reconstructing a surface of an object, comprising steps of:

modulating a light beam by a spatial light modulator (SLM), and the light beam being projected to form a pattern, wherein the pattern has a transmittance distribution in a cosine distribution such that the pattern is formed to become a fringe pattern with a periodic change, the transmittance distribution at least comprises a first impulse and a second impulse, and the first impulse and the second impulse respectively present within a first period and a second period of the cosine distribution, wherein a position where the first impulse occurs within the first period and a position where the second impulse occurs within the second period are different;

guiding the light beam to the object, such that a scan pattern is formed on the object;

reading the scan pattern; and calculating a surface profile of the object according to the scan pattern.

2. The method of claim 1, wherein the pattern is formed by a plurality of pixels aligned along a direction of a straight line, and the cosine distribution satisfies:

$$t = A + B\cos\left[\frac{2\pi x}{T_0} + \frac{2\pi m}{M}\delta(x - nT_0 - l)\right],$$

wherein t is the transmittance distribution of the fringe pattern, A and B are real numbers, x is a pixel order on the direction of the straight line, $T_0$ is a fringe period of the fringe pattern, and x. M, m, n and 1 are positive natural numbers, wherein m<M, 1<$T_0$, and the positions where the first impulse and the second impulse occur within are defined by $\delta(x-nT_0-l)$.

3. The method of claim 1, wherein a peak value of the first impulse and a peak value of the second impulse are different.

4. The method of claim 1, wherein the first period and the second period are two continuous periods of the cosine distribution.

5. The method of claim 1, wherein the step of calculating the surface profile of the object comprises:

reconstructing the surface profile of the object by a phase-shifting interferometry, and the phase-shifting interferometry is at least a three-step phase-shifting.

6. A method for reconstructing a surface of an object, comprising steps of:

modulating a light beam by a spatial light modulator (SLM), and the light beam being projected to form a pattern, wherein the pattern has a transmittance distribution defined by a sinusoidal wave equation such that the pattern is formed to become a fringe pattern with a phase distribution, wherein a first period of the phase distribution has an impulse variation in a first degree, and a second period of the phase distribution has an impulse variation in a second degree, wherein a position where the impulse variation in the first degree occurs within the first period is a first relative position, and a position wherein the impulse variation in the second degree occurs within the second period is a second relative position, wherein the first degree and the second degree have difference, or the first relative position and the second relative position have difference;

guiding the light beam to the object, such that a scan pattern is formed on the object;

reading the scan pattern; and calculating a surface profile of the object according to the scan pattern.

7. The method of claim 6, wherein the pattern is formed by a plurality of pixels aligned along a direction of a straight line, and the sinusoidal wave equation satisfies:

$$t = A + B\cos\left[\frac{2\pi x}{T_0} + \frac{2\pi m}{M}\delta(x - nT_0 - l)\right],$$

wherein t is the transmittance distribution of the fringe pattern, A and B are real numbers, x is a pixel order on the direction of the straight line, $T_0$ is a fringe period of the fringe pattern, and x. M, m, n and 1 are positive natural numbers, wherein m<M, 1<$T_0$, and the positions where the first relative position and the second relative position occur are defined by $\delta(x-nT_0-l)$.

8. The method of claim 6, wherein the first degree and the second degree are different, and the first relative position and the second relative position are the same.

9. The method of claim 6, wherein the first degree and the second degree are the same, and the first relative position and the second relative position are different.

10. The method of claim 6, wherein the first degree and the second degree are different, and the first relative position and the second relative position are different.

11. An optical system for reconstructing a surface of an object, comprising:

a spatial light modulator (SLM), for modulating a light beam, and the light beam being projected to form a pattern, wherein the pattern has a transmittance distribution defined by a sinusoidal wave equation such that the pattern is formed to become a fringe pattern with a phase distribution, wherein a first period of the phase distribution has an impulse variation in a first degree, and a second period of the phase distribution has an impulse variation in a second degree, wherein a position where the impulse variation in the first degree occurs within the first period is a first relative position, and a position wherein the impulse variation in the second degree occurs within the second period is a second relative position, wherein the first degree and the second degree have difference, or the first relative position and the second relative position have difference;

an image receiving device; and a pair of light guiding lenses, respectively optical coupling to the spatial light modulator and the image receiving device.

12. The optical system of claim 11, wherein the pattern is formed by a plurality of pixels aligned along a direction of a straight line, and the sinusoidal wave equation satisfies:

$$t = A + B\cos\left[\frac{2\pi x}{T_0} + \frac{2\pi m}{M}\delta(x - nT_0 - l)\right],$$

wherein t is the transmittance distribution of the fringe pattern, A and B are real numbers, x is a pixel order on the direction of the straight line, $T_0$ is a fringe period of the fringe pattern, and x. M, m, n and l are positive natural numbers, wherein m<M, l<$T_0$, and the positions where the first relative position and the second relative position occur are defined by $\delta(x-nT_0-l)$.

* * * * *